US 6,749,059 B2

(12) United States Patent
Gundlach et al.

(10) Patent No.: US 6,749,059 B2
(45) Date of Patent: *Jun. 15, 2004

(54) MODULAR CONVEYOR BELT WITH TWO-PART HINGE PIN

(75) Inventors: James O. Gundlach, New Orleans, LA (US); Christopher G. Greve, Covington, LA (US); Robert S. Lapeyre, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 66 days.

This patent is subject to a terminal disclaimer.

(21) Appl. No.: 09/940,842

(22) Filed: Aug. 28, 2001

(65) Prior Publication Data

US 2003/0042116 A1 Mar. 6, 2003

(51) Int. Cl.[7] .............................................. B65G 17/06
(52) U.S. Cl. ...................... 198/851; 198/850; 198/852; 474/207; 474/214
(58) Field of Search ................................ 198/851, 850, 198/852; 474/214, 207, 213

(56) References Cited

U.S. PATENT DOCUMENTS

| 1,564,798 | A | | 12/1925 | Sturtevant |
| 2,987,332 | A | * | 6/1961 | Bonmartoni ................. 305/42 |
| 3,628,392 | A | * | 12/1971 | Ivashkov et al. ........... 474/207 |
| 3,742,776 | A | | 7/1973 | Avramidis |
| 3,980,173 | A | | 9/1976 | Riggs |
| 4,010,656 | A | | 3/1977 | Jeffrey |
| 4,130,026 | A | * | 12/1978 | Jeffrey ........................ 474/215 |
| 4,140,025 | A | | 2/1979 | Lapeyre |
| 4,186,617 | A | * | 2/1980 | Avramidis et al. .......... 474/229 |
| 4,507,106 | A | | 3/1985 | Cole, Jr. |
| 5,083,659 | A | | 1/1992 | Bode et al. .................. 198/853 |
| 5,125,874 | A | | 6/1992 | Fryer et al. |
| 5,372,554 | A | * | 12/1994 | Okuda ......................... 474/206 |
| 5,941,059 | A | * | 8/1999 | Kanehira et al. ................. 59/5 |
| 6,135,908 | A | * | 10/2000 | Greiter ........................ 474/215 |
| 6,186,921 | B1 | * | 2/2001 | Kotera ........................ 474/215 |
| 6,213,292 | B1 | * | 4/2001 | Takahashi et al. .......... 198/853 |
| 6,360,881 | B2 | * | 3/2002 | Stebnicki et al. ........... 198/850 |
| 6,387,003 | B2 | * | 5/2002 | Horie et al. ................. 474/215 |
| 6,439,378 | B1 | * | 8/2002 | MacLachlan ............... 198/850 |

FOREIGN PATENT DOCUMENTS

GB        2108456 A        5/1981

OTHER PUBLICATIONS

Search Report of International Application No. PCT/US02/26539, mailed Dec. 9, 2002.

* cited by examiner

*Primary Examiner*—Khoi H. Tran
(74) *Attorney, Agent, or Firm*—James T. Cronvich

(57) ABSTRACT

A modular conveyor belt forming a hinge between consecutive belt rows hingedly connected by a two-part hinge pin. Hinge eyes along the forward and rearward ends of each row of belt modules include aligned openings for the hinge pins. The belt rows are arranged end-to-end with the hinge eyes of adjacent rows interleaved. The hinge pins are inserted in the passageway formed by the aligned openings of the interleaved hinge eyes. The hinge pins include first and second hinge pin members, such as flat strips. The openings in the hinge eyes are characterized by a narrow slotted portion for restraining the first hinge pin member against rotation within the slotted portion and a wider sector-shaped portion that allows the second hinge pin member to rotate relative to the first hinge pin member.

20 Claims, 5 Drawing Sheets

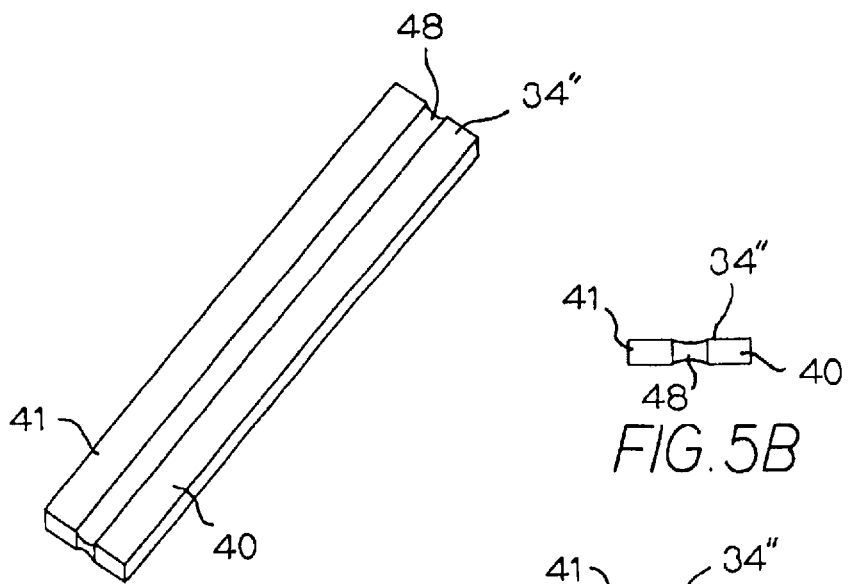
FIG.5A
FIG.5B
FIG.5C
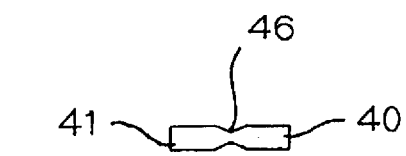
FIG.4B
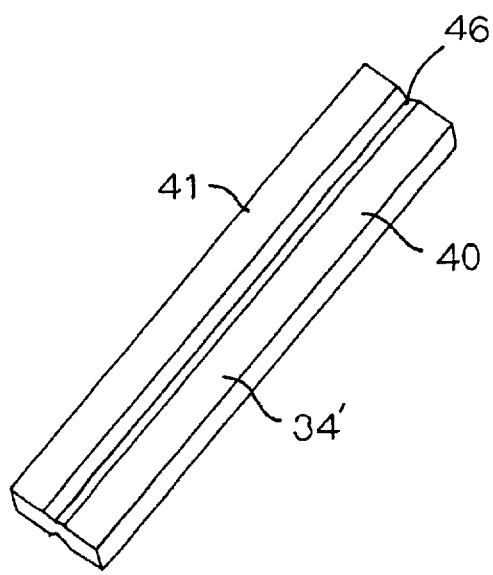
FIG.4A
FIG.4C

MODULAR CONVEYOR BELT WITH TWO-PART HINGE PIN

BACKGROUND

The invention relates generally to power-driven modular plastic conveyor belts and, more particularly, to modular plastic conveyor belts hingedly interconnected row to row by two-part hinge pins.

Conventional modular conveyor belts and chains are constructed of modular links, or belt modules, arranged in rows. Spaced apart hinge eyes extending from each end of the modules include aligned openings. The hinge eyes along one end of a row of modules are interleaved with the hinge eyes of an adjacent row. A pivot rod, or hinge pin, journalled in the aligned openings of interleaved hinge eyes, connects adjacent rows together end to end to form an endless conveyor belt capable of articulating about a drive sprocket or drum.

Because they do not corrode and are easy to clean, modular plastic conveyor belts are often used instead of metal belts. Usually, the hinge pins in plastic belts are also made of plastic. The hinge pins are typically circular in cross section and reside in circular openings in the hinge eyes. Relative motion between the hinge pins and the walls of the hinge eyes as the belt articulates about sprockets tends to wear both the hinge pin and the hinge eye wall. In abrasive environments, such as in conveying potatoes and other agricultural produce, this wear is accelerated by the intrusion of dirt and grit into the hinges of the belt.

Metal hinge pins are sometimes used to increase the wear life of the pins. But that does not do away with the relative motion between pin and hinge eye wall, and belt module wear at the hinge is still a problem.

Non-circular hinge strips made of a flexible material have been proposed to resist wear. Hinge eyes forming slots with flared ends permit the confined hinge strip to flex a limited angle without frictionally rubbing with the hinge eyes as the belt articulates. Such an arrangement is effective in increasing wear life, but the flexible hinge strip is inherently weak in shear strength and unsuitable for carrying heavy loads.

Some power transmission chains constructed of metal components use a pair of pins in each joint between consecutive groups of links. At each joint, one pin is wedged into the openings of one group of links and another pin, in rocking engagement with the first pin, is wedged in the openings of the adjacent group of links. In this way, relative motion is confined to the rocking surfaces of the metal pins. But transmission chains and modular conveyor belts operate in different environments and serve different purposes. Power transmission chains often are used in well-lubricated environments, relatively free of abrasives, as in internal combustion engines and other machinery in which the use of gears is impractical. Modular conveyor belts, on the other hand, are frequently used in very abrasive, non-lubricated environments to move various products over long distances.

Thus, there is a need for a modular plastic conveyor belt that can resist wear at the hinge for a long operating life even in abrasive environments.

SUMMARY

This need and others are satisfied by a modular plastic belt having features of the invention. The belt is formed of a series of rows of belt modules having a conveying surface. Each row includes one or more belt modules extending from a forward end to a rearward end in the direction of belt travel. A first set of hinge eyes is arranged along the forward end, and a second set of hinge eyes is arranged along the rearward end. Openings formed in the hinge eyes extend from a first end to a second end. The openings are narrower at the first end than at the second end. The rows are arranged end-to-end with the first set of hinge eyes of a row interleaved with the second set of hinge eyes of an adjacent row. The rows are hingedly connected together to form a conveyor belt by a plurality of hinge pins, each of which is divided lengthwise into two parts: a first hinge pin member and a second hinge pin member. The first hinge pin member is disposed in the first end of the openings in the first set of hinge eyes of a row and in the second end of the openings in the interleaved second set of hinge eyes of the adjacent row. The second hinge pin member is disposed in the second end of the openings in the first set of hinge eyes of the row and in the first end of the openings in the interleaved second set of hinge eyes of the adjacent row. In this way, the first hinge pin member is restrained in the narrow first end of the opening from rotational motion with respect to the first set of hinge eyes of the row, but is free to roll or rotate relative to the second hinge pin member and to the second set of hinge eyes in the adjacent row. With the elimination of the relative sliding or scrubbing motion between pin and hinge eye and the introduction of rolling motion between the first and second hinge pin members, wear life is increased, especially in abrasive conditions.

In preferred versions of the conveyor belt, the hinge pin members are of identical cross-section. This reduces the number of unique parts and makes for easier assembly and repair, when needed. In one version, the hinge pin is divided into identical hinge pin members, such as flat strips. In another version of the invention, the hinge pins are formed as a single piece with a frangible region between the first and second hinge pin members to allow the unitized hinge pin to be inserted easily into the hinge eye openings. Subsequent flexing of the belt at the hinge breaks the frangible region and separates the unitized hinge pin into the first and second hinge pin members.

Confronting faces on the first and second hinge pin members that bear against each other may be parabolic, hyperbolic, ellipsoidal, circular arcs, V-shaped, or a combination of flat and curved surfaces, for example. To prevent the confronting faces of the hinge pin members from wearing quickly, the hinge pins can be made of durable materials, such as polyurethanes, polyamides, polyvinylchlorides, fluorocarbons, and stainless steel.

In another version, the hinge pin is manufactured with a flexible bridge connected between the first and second hinge pin members to form a living hinge in the pin between the two hinge pin members. Such a pin can be made by co-injection molding or co-extrusion, for example.

In another version, the openings are formed with a slotted portion at the narrow first end to restrain the hinge pin member confined therein and a sector-shaped portion of the second end to allow the associated hinge pin member freedom to rotate relative to the restrained hinge pin member. The openings may be oriented with an axis of symmetry in the direction of belt travel or oblique to the direction of belt travel.

Thus, a conveyor belt embodying features of the invention eliminates relative rubbing contact between hinge pin and belt module, thereby making such a conveyor belt particularly long-lasting in abrasive environments.

DRAWINGS

These and other features, aspects, and advantages of the invention are described in more detail in the following description, appended claims, and accompanying drawings in which:

FIGS. 4A–4C are isometric and elevation views of yet another version of hinge pin having a frangible region usable in the conveyor belt of FIG. 1;

Figure 1:
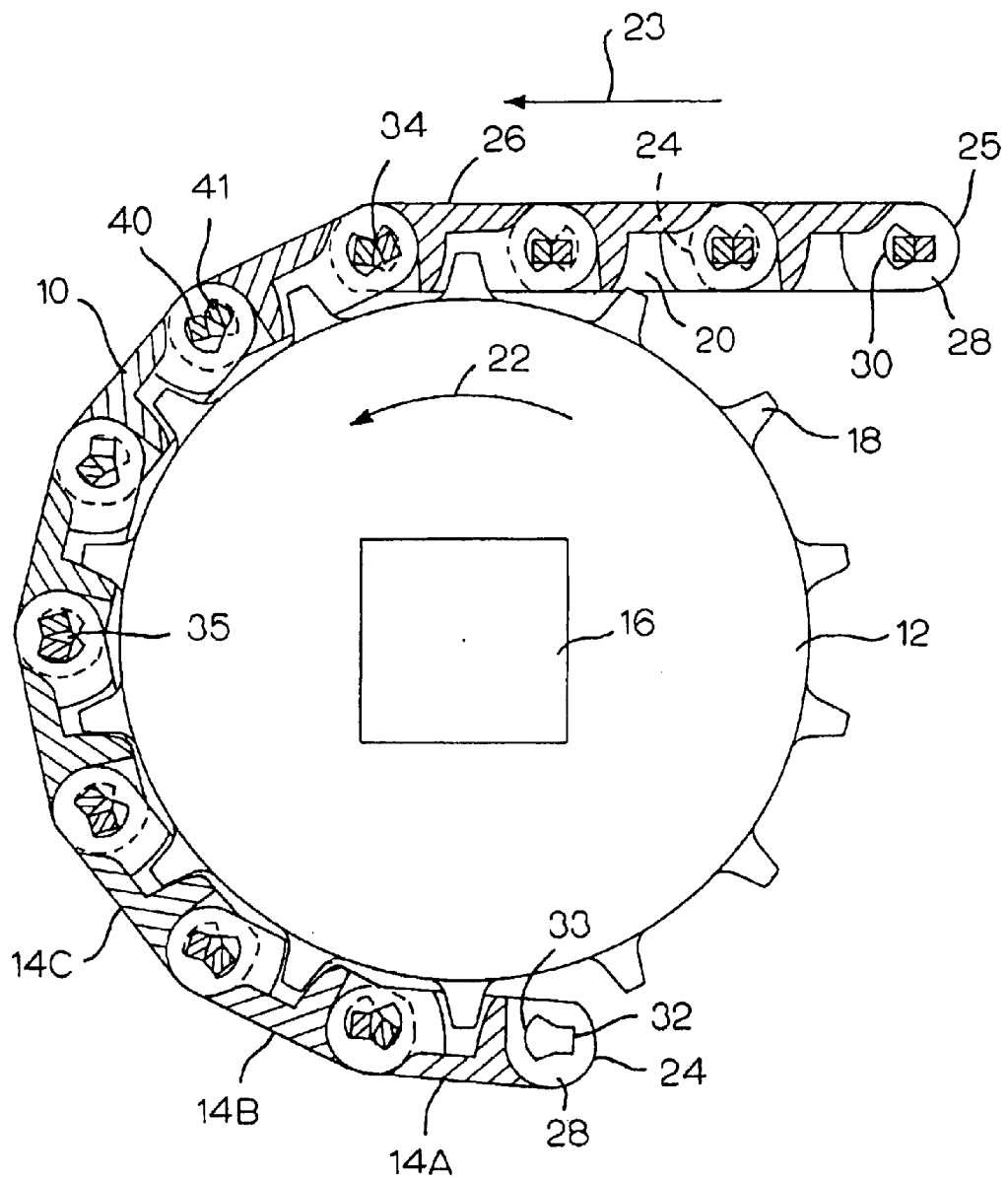
FIG. 1 is a partial side cross-sectional elevation view of a conveyor belt embodying features of the invention.
Figure 6A:
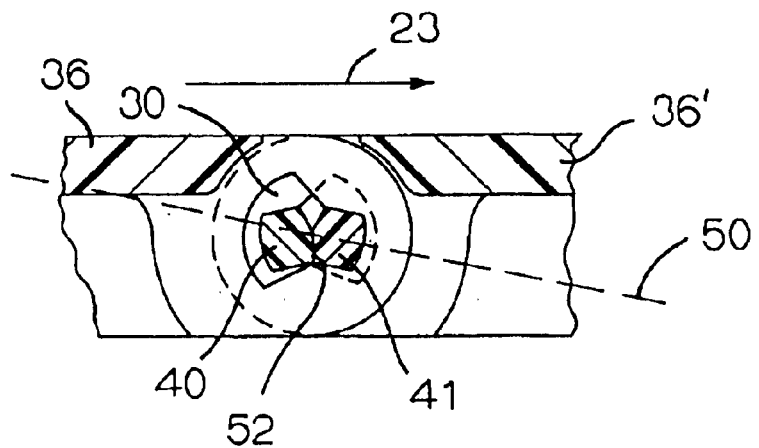
Figure 6B:
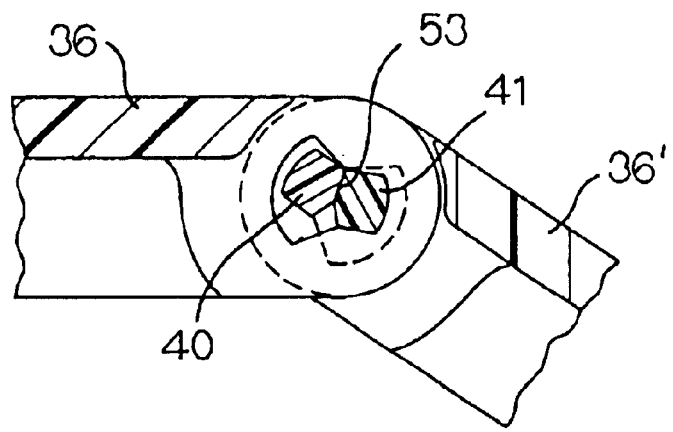

FIGS. 5A–5C are isometric and elevation views of yet another version of hinge pin having a flexible connection between two hinge pin members usable in the conveyor belt of FIG. 1; and FIG. 6A is a partial side elevation view of the hinge of a conveyor belt as in FIG. 1, but with a differently oriented hinge eye opening, and FIG. 6B is a view as in FIG. 6A, showing the belt articulating at the hinge.

DETAILED DESCRIPTION

A portion of a conveyor belt 10 having features of the invention is shown in FIG. 1 engaged with and articulating about a sprocket 12. The belt is made up of a series of rows, such as the three consecutive rows 14A–C. Each row may consist of a single belt module defining the width of the belt or multiple modules arranged side by side, typically in a brick-lay pattern from row to row, across the width of the belt. Typical modular plastic conveyor belts are manufactured and sold, for example, by Intralox, Inc. of Harahan, La., USA. The belt modules are conventionally made by injection-molding thermoplastic materials such as polypropylene, polyethylene, acetal, nylon, or composite polymers, to name a few. The sprocket has a central bore 16 for a shaft (not shown), which may be driven by a drive motor (not shown). Teeth 18 on the periphery of the sprocket engage drive surfaces in the belt, such as the walls of drive pockets 20 formed in the underside of the belt. As the sprocket rotates in the direction of curved arrow 22, the belt is driven in a direction of travel indicated by arrow 23. The modules on each row extend in the direction of belt travel from a forward end 24 to a rearward end 25. The outer sides of the belt modules form a conveying surface 26 on which articles are conveyed. One or more hinge eyes 28 are arranged along the forward and rearward ends of each row. An opening 30 is formed in the hinge eyes. The opening extends from a first end 32 to a second end 33. The opening is narrower at the first end than at the second end. The rows are arranged end-to-end with a first set of hinge eyes along the forward end of a trailing row interleaved with a second set of hinge eyes along the rearward end of an adjacent leading row. In this arrangement, the openings in the hinge eyes form a continuous passageway between each belt row. A hinge pin 34 extends through the passageway to form with the interleaved hinge pins a hinge 35 between adjacent rows at which the belt can articulate.

Figure 2:
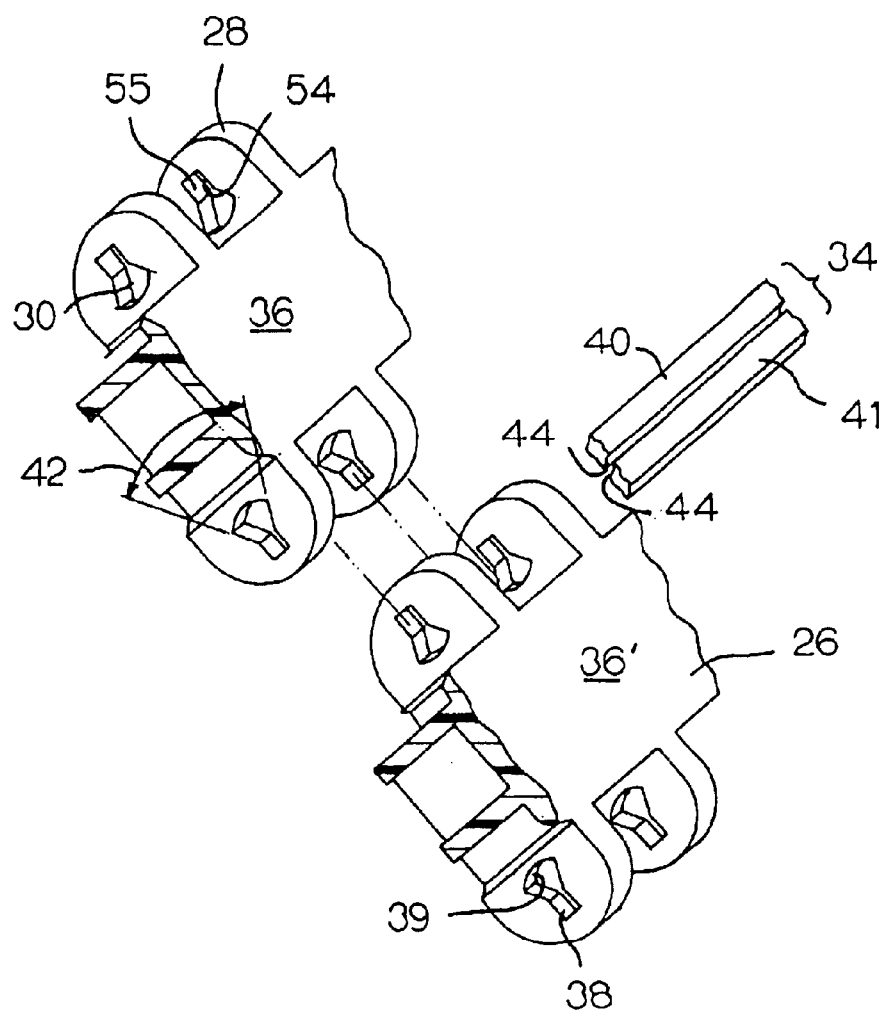
FIG. 2 is a partial exploded cross-sectional isometric view of the hinge region between two adjacent rows of the conveyor belt of FIG. 1.

The formation of the hinge is shown in FIG. 2 as well. Belt modules 36, 36' from adjacent rows are shown separated for clarity. Each opening 30 has a slotted portion 38 at the narrow first end and a sector-shaped portion 39 at the second end. The openings are shown in this example with an axis of symmetry in the direction of belt travel to allow for equal articulation and backflexing ranges. The two-part hinge pin 34 is divided lengthwise into a pair of hinge pin members 40, 41, shown in the examples of FIGS. 1 and 2 as separated strips of identical cross-section. The first hinge pin member 40 is nested in the narrow slotted portion 38 of the openings in the first set of hinge eyes of the module 36'. The second hinge pin member 41 resides in the sector-shaped portion 39 of those openings in the module 36'. Rather than being circular in cross section and susceptible to rolling, the hinge pin members preferably have distinct sides, such as four sides as generally shown in FIGS. 1 and 2. Thus, upper and lower walls 54, 55 of the slotted portion of the opening form restraining surfaces that restrain the first hinge pin member in the narrow, restricted region of the opening and prevent the first hinge pin member from rotating relative to the module 36'. The spacing between the upper and lower walls is slightly greater than the thickness of the confined hinge pin member. The sector-shaped portion, on the other hand, forms an open region that allows the second hinge pin member 41 to rotate through a range of articulation angles 42 defined by the arc length of the sector. Conversely, the openings in the hinge eyes of the module 36 on the adjacent row restrain the second hinge pin member and provide freedom of articulation to the first hinge pin member. In this way, there is no relative rubbing motion between the hinge pin and the hinge eye. The only relative motion is between the confronting faces 44 of the side-by-side hinge pin members. The hinge pins are preferably made of a thermoplastic material formed by molding or extrusion. The wear life of the hinge pin can be extended by manufacturing the hinge pin out of a strong, durable material, such as polyurethanes, polyamides, polyvinylchlorides, fluorocarbons, and stainless steel. As used herein, a durable material is any material characterized by an abrasion-resistance superior to the abrasion-resistance of polymers such as polyethylene and polypropylene. Thus, because relative motion between hinge pin and belt module is diminished, belt modules can be made of standard materials, such as polypropylenes, polyethylenes, acetal, nylon, or composites and still have a long life even in abrasive environments.

Figure 3A:
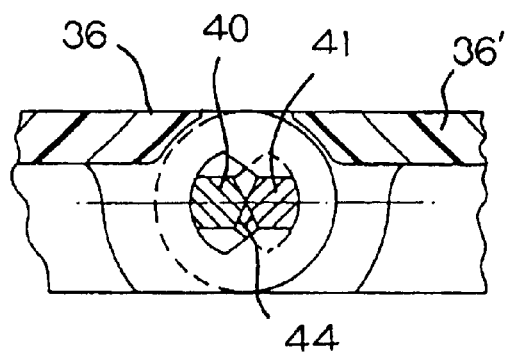
FIGS. 3A–3C are partial side elevation views of the hinge of a conveyor belt as in FIG. 1, but with different versions of hinge pins.
Figure 3B:
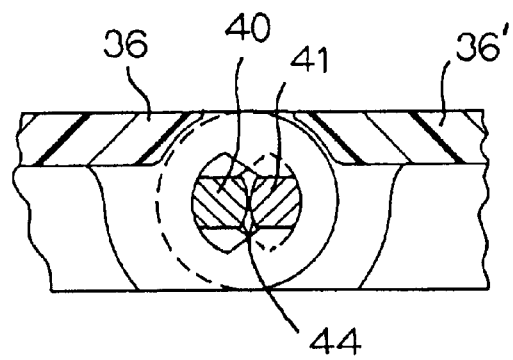
Figure 3C:
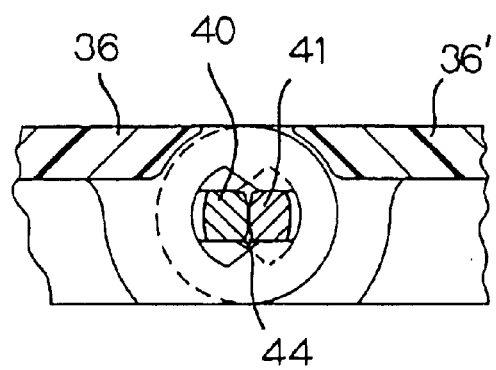

Various versions of hinge pins are illustrated in the examples of FIGS. 3A–C. In FIG. 3A, the confronting rocker faces of the hinge pin members 40, 41 are V-shaped with two flat surfaces. In FIG. 3B, the faces are portions of a circular arc. In FIG. 3C, the curved faces represent that parabolic, hyperbolic, or ellipsoidal surfaces are possible. These and other shapes, or combinations of these flat and curved shapes, can be used effectively. The confronting faces contact each other and bear the pull, or tension, of the belt. As the belt articulates about a sprocket and consecutive rows rotate relative to each other, the confronting faces of the hinge pin members rock against each other. The rocking motion results in less wear than the rubbing motion between hinge pin and hinge eye in typical belts.

Another version of hinge pin 34' is shown in FIGS. 4A–4C. This hinge pin is formed as a single piece made up of first hinge pin member 40 and second hinge pin member 41 connected by a frangible region 46, such as a thinned-out webbing or a perforated region. This hinge pin is easier to insert into the hinge eye openings during belt construction than two separated hinge pin members. Articulation of the belt causes the frangible region to break, separating the two hinge pin members for normal belt operation.

Yet another version of hinge pin 34" is shown in FIGS. 5A–C. Unlike in previously described versions, the two hinge pin members 40, 41 are not separated into unconnected pieces. Instead, they are connected by a bridge 48 made of a flexible material, such as an elastomer (e.g., polyurethanes, polyesters, and polyethers). The flexible bridge forms a living hinge between the two hinge pin elements that permits the hinge to function as it does with separated hinge pin members. This two-material hinge pin can be made using a co-molded or a co-extruded process. By filling the gap between the two hinge pin members, the flexible bridge keeps abrasives out.

In the versions shown in FIGS. 6A–B, the axis of symmetry 50 of each hinge-eye opening 30 is oblique to the direction of belt travel 23. In this way, the two hinge pin members, for example, V-shaped members 40, 41 in FIGS. 6A–B, can be made to contact each other along lower contact regions 52 of their confronting faces on straight runs (FIG. 6A) and along upper contact regions 53 when the belt is articulating about a sprocket (FIG. 6B) rather than on the vertex of the V. The increased contact area reduces the pressure between the hinge pin members and the associated wear.

Although the invention has been described in detail with respect to a few preferred versions, other versions are possible. For example, the openings need not be symmetrical; the sector-shaped portion could allow for more rotation in one direction than in the other. The shape of the openings could be other than as shown in the drawings. A rounded triangular shape, for instance, that restrains one of the hinge pin members at one vertex and allows the other hinge pin free to rotate along its opposite base would function according to the invention. Therefore, as these few examples suggest, the scope of the claims should not be limited to the description of the preferred versions.

What is claimed is:

1. A modular plastic conveyor belt suitable for abrasive environments, the conveyor belt comprising:
    a series of rows of belt modules wherein each row includes at least one belt module extending from a forward end to a rearward end in the direction of belt travel and including a first set of hinge eyes along the forward end and a second set of hinge eyes along the rearward end, wherein the hinge eyes form aligned openings therethrough extending from a first end to a second end and wherein the openings are narrower at the first end than at the second end, the rows being arranged end to end with the first set of hinge eyes of a row interleaved with the second set of hinge eyes of an adjacent row; and
    a plurality of hinge pins, each divided lengthwise into a first hinge pin member and a second hinge pin member and arranged in the openings in the interleaved hinge eyes at the ends of each row to connect consecutive rows into a conveyor belt having a hinge between consecutive rows.

2. A modular plastic conveyor belt as in claim 1 wherein the first hinge pin member and the second hinge pin matter are identical.

3. A modular conveyor belt as in claim 1 wherein the first and second hinge pin members have confronting faces that bear against each other as the belt travels.

4. A modular conveyor belt as in claim 3 wherein the confronting faces have curved surface shapes selected from the group consisting of parabolic, hyperbolic, and ellipsoidal shapes.

5. A modular conveyor belt as in claim 3 wherein the confronting faces are circular arcs.

6. A modular conveyor belt as in claim 3 wherein the confronting faces are V-shaped.

7. A modular conveyor belt as in claim 3 wherein the confronting faces are a combination of flat surfaces and curved surfaces.

8. A modular conveyor belt as in claim 1 wherein the first and the second hinge pin members are flat strips.

9. A modular conveyor belt as in claim 1 wherein the hinge pins are made of a material selected from the group consisting of polyurethanes, polyamides, polyvinylchlorides, fluorocarbons, and stainless steel.

10. A modular conveyor belt as in claim 1 wherein the hinge pins are manufactured with a frangible region between the first hinge pin member and the second hinge pin member that can be broken to separate the first hinge pin member from the second hinge pin member.

11. A modular conveyor belt as in claim 1 wherein the hinge pins include a flexible bridge connected between the first hinge pin member and the second hinge pin member.

12. A modular conveyor belt as in claim 1 wherein the openings are characterized by a slotted portion at the narrow first end and a sector-shaped portion at the second end.

13. A modular conveyor belt as in claim 12 wherein the first hinge pin member resides in the slotted portion of the openings in the hinge eyes along the forward end of a row and the second hinge pin member resides in the sector-shaped portion of the openings in the hinge eyes along the forward end of the row.

14. A modular conveyor belt as in claim 1 wherein the openings have an axis of symmetry oblique to the direction of belt travel.

15. A modular plastic conveyor belt suitable for abrasive environments, the conveyor belt comprising:
    a series of rows of belt modules wherein each row includes at least one belt module extending from a forward end to a rearward end in the direction of belt travel and including a first set of hinge eyes along the forward end and a second set of hinge eyes along the rearward end, wherein the hinge eyes form aligned openings therethrough extending from a first end to a second end and wherein the openings are defined by a restricted region at the first end and an open region at the second end, the rows being arranged end to end with the first set of hinge eyes of a row interleaved with the second set of hinge eyes of an adjacent row; and
    a plurality of two-part hinge pins, each hinge pin including a first hinge pin member and a second hinge pin member arranged side by side in the openings in the interleaved hinge eyes at the ends of each row to connect consecutive rows together and form a hinge, the hinge pin members having confronting faces that rock against each other as the belt articulates at the hinge.

16. A modular plastic conveyor belt as in claim 15 further including restraining surfaces defining the restricted region of the first set of hinge eyes that restrain the first hinge pin member from rotating and wherein the second hinge pin member resides in the open region of the opening in the first set of hinge eyes.

17. A modular plastic conveyor belt suitable for abrasive environments, me conveyor belt comprising:
    a series of rows of belt modules wherein each row includes at least one belt module extending from a forward end to a rearward end in the direction of belt travel and including a first set of hinge eyes along the forward end and a second set of hinge eyes along to rearward end, wherein the hinge eyes form aligned openings therethrough extending from a first end to a second end and wherein the openings are defined by a restricted region at the first end and an open region at the second end, the rows being arranged end to end wit the first set of hinge eyes of a row interleaved with the second set of hinge eyes of an adjacent row such that the restricted regions of the openings in the hinge eyes along an end of a row are aligned with the open regions of the openings in the interleaved hinge eyes of an adjacent row;

a first hinge pin member confined in the restricted regions of the openings in the first set of hinge eyes along the forward end of a trailing row and disposed in to open regions of the openings in the second set of interleaved hinge eyes along the rearward end of a leading row; and a second hinge pin member confined in the restricted regions of the openings in the second set of hinge eyes along the rearward end of the leading row and disposed in the open regions of the openings in the first set of interleaved hinge eyes along the forward end of the trailing row, wherein the first and second hinge pin members include confronting faces that rock on each other as the belt articulates.

18. A modular plastic conveyor belt suitable for abrasive environments, the conveyor belt comprising:

a series of rows of belt modules wherein each row includes at least one belt module extending from a forward end to a rearward end in the direction of belt travel and including a first set of hinge eyes along the forward end and a second set of hinge eyes along the rearward end, wherein the hinge eyes form aligned openings therethrough, the rows being arranged end to end with the first set of hinge eyes of a row interleaved with the second set of hinge eyes of an adjacent row with the aligned openings of interleaved hinge eyes forming a continuous passageway; and a plurality of two-part hinge pins, each including a first non-circular hinge pin member and a second non-circular hinge pin member arranged side by side in the passageway formed by the aligned openings in the interleaved hinge eyes at the ends of each row to connect consecutive rows into a conveyor belt having a hinge between consecutive rows.

19. A modular plastic conveyor belt suitable for abrasive environments, the conveyor belt comprising:

a series of rows of belt modules wherein each row includes at least one belt module extending from a forward end to a rearward end in the direction of belt travel and including a first set of hinge eyes along the forward end and a second set of hinge eyes along the rearward end, wherein the hinge eyes form aligned openings therethrough, the rows being arranged end to end with the first set of hinge eyes of a row interleaved with the second set of hinge eyes of an adjacent row with the aligned openings of interleaved hinge eyes forming a continuous passageway across the row; and a first hinge pin member confined in the passageway and including a first face; and a second hinge pin member confined in the passageway side by side with the first hinge pin member to form a belt capable of articulating between consecutive rows, the second hinge pin member including a second face arranged in opposition to the first face of the first hinge pin member, wherein the first and second opposed faces move relative to each other as the belt articulates.

20. A modular plastic conveyor belt suitable for abrasive environments, the conveyor belt comprising:

a series of rows of belt modules wherein each row includes at least one belt module extending from a forward end to a rearward end in the direction of belt travel and including a first set of hinge eyes along the forward end and a second set of hinge eyes along the rearward end, wherein the hinge eyes form aligned openings therethrough extending from a first end to a second end, the rows being arranged east to end wherein the first set of hinge eyes of a trailing row are interleaved with the second set of hinge eyes of a leading row with the aligned openings forming a continuous passageway across the belt;

a first hinge pin member confined in the first end of the openings in the first set of hinge eyes along the forward end of a trailing row and substantially restrained in the first end from rotation relative to the trailing row, the first hinge pin member further being positioned in the second end of the openings in the second set of hinge eyes along the rearward end of a leading row and free to rotate relative to the leading row over a first angular range; and a second hinge pin member confined in the first end of the openings in the second set of hinge eyes along the rearward end of the leading row and substantially restrained in the first end from rotation relative to the leading row, the second hinge pin member further being positioned in the second end of the openings in the first set of hinge eyes along the forward end of a trailing row and free to rotate relative to the trailing row over a second angular range;

wherein the first and second hinge pin members are arranged side by side in the passageway to link consecutive rows together at a hinge.

* * * * *